United States Patent [19]
Guillaume et al.

[11] 4,279,208
[45] Jul. 21, 1981

[54] METHOD AND APPARATUS FOR HEAT TREATMENT OF INDUSTRIAL WASTES

[75] Inventors: Paul Guillaume, Paris; Pierre Karinthi, Jouy-en-Josas; Jacques Nicolas, Paris, all of France

[73] Assignee: L'Air Liquide, Societe Anonyme Pour l'Etude et l'Exploitation des Procedes Georges Claude, Paris, France

[21] Appl. No.: 99,888

[22] Filed: Dec. 3, 1979

[30] Foreign Application Priority Data

Dec. 4, 1978 [FR] France ............................... 78 34096

[51] Int. Cl.³ .............................................. F23G 5/02
[52] U.S. Cl. .................................... 110/346; 110/188; 110/212; 110/214; 110/235; 236/15 E; 431/76
[58] Field of Search ............... 110/185, 188, 210, 212, 110/214, 235, 251, 346, 345, 348; 236/95 E; 431/12, 76

[56] References Cited

U.S. PATENT DOCUMENTS

| | | |
|---|---|---|
| 3,223,058 | 12/1965 | Tanner . |
| 3,267,890 | 8/1966 | Zinh et al. ............................ 110/214 |
| 3,366,080 | 1/1968 | Albertson . |
| 3,905,312 | 9/1975 | Nichols . |
| 4,013,023 | 3/1977 | Lombana et al. . |
| 4,037,543 | 7/1977 | Angelo . |
| 4,046,086 | 9/1977 | Von Dreusche, Jr. ......... 110/346 X |
| 4,182,246 | 1/1980 | Lombana et al. ..................... 110/188 |
| 4,235,171 | 11/1980 | Leonard .............................. 110/188 |

*Primary Examiner*—Edward G. Favors
*Attorney, Agent, or Firm*—Lee C. Robinson, Jr.

[57] ABSTRACT

A method and apparatus for the heat treatment of industrial wastes wherein at least some of the constituent materials of the wastes are subjected to combustion and/or to pyrolysis to produce flue gases and, in some applications, a residue. The supply of an oxygenated combustion-supporting gas to the wastes is regulated as a function of at least one sensed predetermined characteristic of the flue gases. The oxygenated gas may be a mixture of air and substantially pure oxygen, the feed rate of one or both of these being regulated in response to the sensed temperature and/or oxygen content of the flue gases. Such regulation maintains the oxygen content of the flue gases within the range of from 0 to 7%; and the temperature of the flue gases may be maintained from 400° to 1200° C. and, preferably within a range of 50° C. in this region.

29 Claims, 1 Drawing Figure

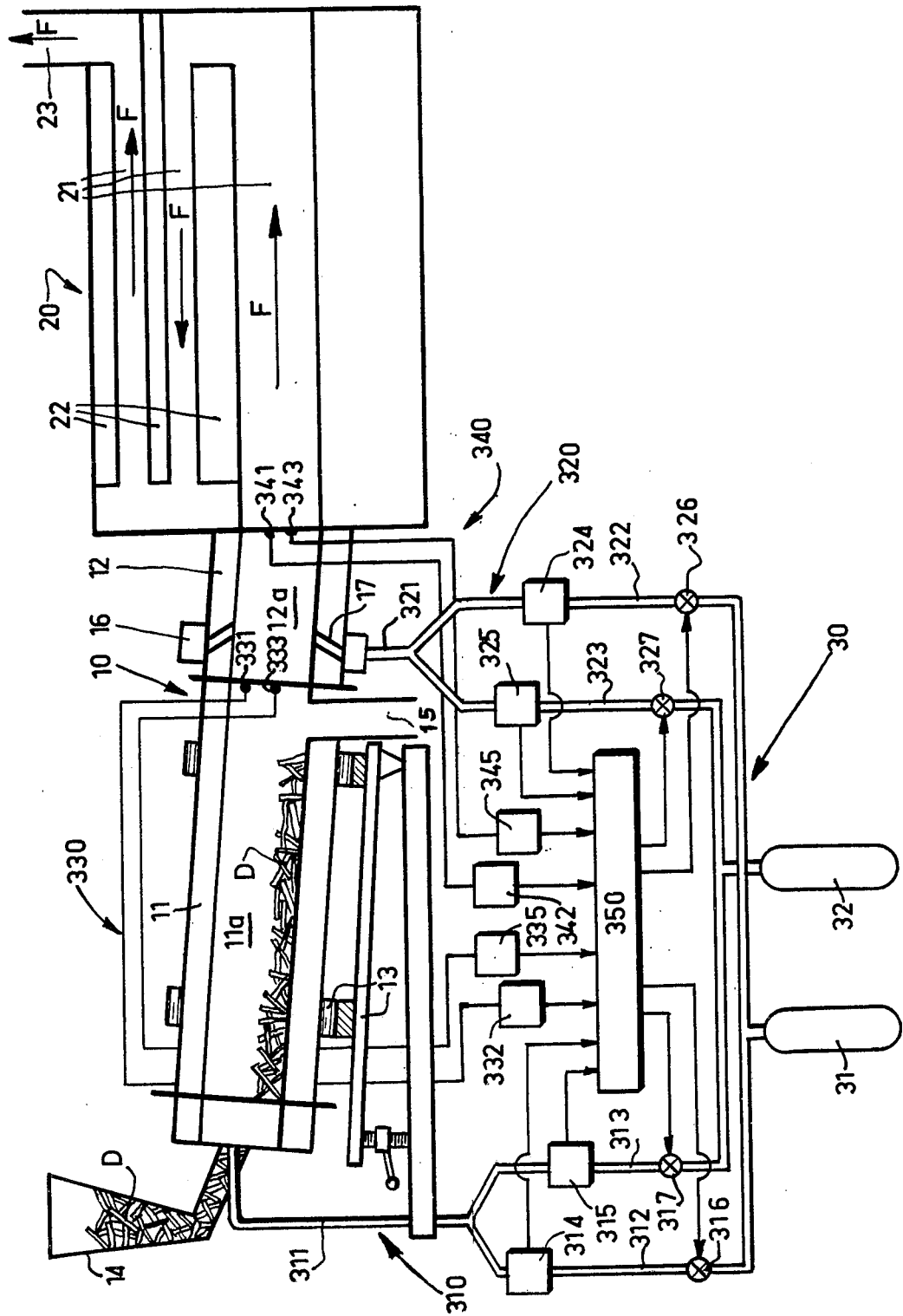

METHOD AND APPARATUS FOR HEAT TREATMENT OF INDUSTRIAL WASTES

BACKGROUND OF THE INVENTION

This invention relates to a method and apparatus for the heat treatment of industrial wastes wherein the wastes are subjected, with the addition of an oxygenated combustion-supporting gas supplied thereto, to pyrolysis and/or combustion of at least some of their constituents. More particularly, this invention is concerned with regulating the oxygenated gas in response to sensed predetermined characteristics produced by the heat treatment, whereby these characteristics are maintained within desired ranges.

Heat treatment is applicable to various types of wastes having different states at ordinary temperature, such as solid (wood, paper, rubber, metals, mineral matter, etc.), pasty (residual slimes) or liquid (residual liquors, cutting oils, diluted solvents, etc.) wastes. Heat treatment is useful in recovering, in the form of residue or incombustible ashes, substances from the waste materials which are relatively readily combustible, and also in recovering, in the form of calories, the thermal energy which such waste materials contain. Optionally, certain incombustible substances, or substances which are combustible only with great difficulty, such as metals, can be recovered by heat treatment of industrial wastes, which substances then can be recycled economically.

At present, the heat treatment of industrial wastes is carried out in installations consisting essentially of an incinerating furnace and a heat receiver, the latter receiving the flue gases from the furnace to recover the calories which such gases contain. The furnace generally comprises a pyrolysis chamber for the wastes and a combustion chamber for the flue gases. Following combustion, the flue gases enter the heat receiver wherein the thermal energy thereof is utilized. Typically, the furnace may be of the rotary type or of the stationary type having a grate. The receiver may be, for example, a steam-generating boiler supplying a turboalternator, a heat exchanger, or the like. The heat of the flue gases vaporizes or heats a mass of water stored in the boiler or a heat-transfer fluid circulating in the exchanger.

The energy output obtained from a combustible product will be greater if combustion is complete or nearly complete. Unfortunately, the conditions for nearly complete combustion, which result in a residue having zero heating value, are more difficult to define and to maintain when wastes are burned than when a conventional fluel is burned. In view of the extreme diversity of the composition of such wastes, and hence of their heating value, the criteria of combustion should be controlled as a function of the composition of an oxygenated combustion-supporting gas and the rate at which it is supplied to the furnace. Optionally, a makeup fuel may be used whenever the heating value of the wastes is too low. Moreover, the economic value of some of the constituents of these wastes, and hence the interest in recovering them, adds to the factors which must be considered for obtaining "good combustion", that is, combustion with maximum output but not destructive to certain recoverable constituents and not damaging to the furnace.

Processes heretofore known are carried out in treating installations wherein the oxygenated gas is atmospheric air blown into the chambers of the furnace by blowers. These processes do not readily allow the various criteria for good combustion to be satisfied, and result in considerable waste, such as residues of combustion which exhibit appreciable heating value due to underoxygenation or too low a feed rate of the oxygenated gas (air), or to an excessive feed rate of the air. Another disadvantage of such processes is their use of excessive makeup fuel, entailing excessive combustion temperatures that result in the destruction of certain useful constituents or in damage to the furnace walls, or the like.

OBJECTS OF THE INVENTION

Therefore, it is an object of the present invention to provide an improved heat treatment method, and apparatus for performing that method, which overcomes the aforenoted disadvantages.

Another object of this invention is to provide a method and apparatus for the heat treatment of industrial wastes in which the supply of an oxygenated combustion-supporting gas to the wastes is regulated to maintain within predetermined limits certain characteristics of the flue gases produced by such heat treatment.

A further object of this invention is to provide heat treatment of industrial wastes in which an oxygenated combustionsupporting gas formed of a mixture of air and oxygen is supplied thereto, the feed rates of the air and oxygen being regulated to maintain within desired ranges the temperature and oxygen content of the flue gases produced by such heat treatment.

An additional object of this invention is to provide a method and apparatus for heat treatment of industrial wastes wherein conditions are defined and regulated to obtain as nearly complete combustion of the wastes as is possible.

Yet another object of this invention is to provide a method and apparatus for heat treatment of industrial wastes wherein the flue gases produced by such heat treatment exhibit a non-zero heating value which can be advantageously utilized.

A still further object of this invention is to provide a method and apparatus for heat treatment of industrial wastes in which selected recoverable constituents are not destroyed. Various other objects, advantages and features of the present invention will become readily apparent from the ensuing detailed discussion, and the novel features will be pointed out in the appended claims.

SUMMARY OF THE INVENTION

In accordance with the present invention, a method and apparatus are provided for the heat treatment of industrial wastes wherein at least some of the constituent materials of the wastes are subjected to combustion and/or to pyrolysis to produce flue gases and, in some applications, a residue. The supply of an oxygenated combustion-supporting gas to the wastes is regulated as a function of at least one sensed predetermined characteristic of the flue gases. Preferably, the oxygenated gas is a mixture of air and substantially pure oxygen, the feed rates of which are regulated to control the oxygen content and feed rate of the oxygenated gas so that the oxygen content of the flue gases is from 0 to 7% and the temperature of the flue gases is within the region 400° to 1200° C.

By regulating not only the feed rate of the oxygenated gas, but also its composition, it is possible to have combustion take place under such conditions that the flue gases have a low oxygen content and a non-zero heating value, as well as a temperature within a region that is based on the nature of the wastes and on the characteristic of the furnace. In other words, the present invention obtains efficient combustion at a controlled temperature, and the conduct of the combustion and the control of the temperature may be effected independently since two parameters are regulated, namely, the oxygen content of the oxygenated gas and the feed rate of the gas (i.e. the feed rate of the oxygen).

An oxygen content of the flue gases ranging from 0 to 7%, and hence slight oxygenation of the flue gases, provides assurance of complete combustion of the wastes while permitting a non-zero heating value of the flue gases to be obtained. A flue-gas temperature in the region 400° to 1200° C. provides assurance that pyrolysis can occur under optimum conditions for any constituent of the wastes, yet this temperature is consistent with the normal operating conditions of most industrial furnaces.

In accordance with another aspect of the invention, the oxygenated gas which is injected into the flue gases has its oxygen content and feed rate regulated such that the adiabatic combustion temperature of the mixture formed by flue gases and oxygenated gas is from 1300° to 1600° C. This range of 1300° to 1600° C. in the adiabatic combustion temperature permits complete combustion of the flue gases and the incombustible solids which they contain. Furthermore, this adiabitic temperature, which corresponds to an actual temperature of between 1400° and 1500° C., also assures an optimum output, under the usual operating conditions of industrial furnaces, of the heat receiver in which the flue gases circulate.

When the oxygenated gas is formed as a mixture of air and pure oxygen, the oxygen content of the mixture may be as high as 100%. By varying the oxygen content of the mixture, the temperature and quality of combustion of the wastes and of the flue gases are regulated concurrently.

In accordance with yet another aspect of the invention, a makeup fuel, for example, a hydrocarbon, is added to the oxygenated combustion-supporting gas. Such makeup fuel may be propane, butane, natural gas, or the like. This addition of makeup fuel is used when the heating value of the wastes is less than 2500 kcal/kg. The amount of makeup fuel which is required depends on the nature of the wastes.

In accordance with a further aspect of the invention, the temperature of the flue gases may be maintained within a 50° C. range of the 400° to 1200° C. region. Such a 50° C. range falls within the usual regulating range of conventional industrial furnaces and therefore permits the steady and efficient operation of the furnace.

BRIEF DESCRIPTION OF THE DRAWINGS

The following detailed description, given by way of example, will best be understood in conjunction with the accompanying drawing in which the single FIGURE is a schematic representation of apparatus capable of carrying out the heat treatment process of the present invention.

DETAILED DESCRIPTION OF A CERTAIN PREFERRED EMBODIMENT

The apparatus schematically shown in the FIGURE comprises an incinerating furnace 10 of the rotary type, in which the pyrolysis and/or combustion of industrial wastes and of the resulting flue gases takes place, and a steam boiler 20, which recovers the thermal energy of these flue gases.

Furnace 10 consists of a rotary drum 11 which defines a first combustion chamber 11a for the wastes, and a stationary drum 12 which defines a second combustion chamber 12a for the flue-gas. Chamber 12a also is known as a post-combustion chamber. Chambers 11a and 12a are provided with one or more burners (not shown). Drum 11 is mounted on a rotary cradle 13, whose inclination can be varied as desired, and is provided at its inlet end with a hopper 14 for receiving (or charging) wastes. A chute 15 or the like is provided at the outlet end of drum 11 for the discharge of the residues of combustion (e.g. ashes and slag). An annular blast box 16 is coupled about drum 12, the annular blast box communicating with chamber 12a through openings 17.

Boiler 20 is provided with staggered or serpentine passageways 21 internally thereof for the circulation of flue gases received from chamber 12a. Conduits 22 alternate with passageways 21 and are adapted to have water circulated therein in the liquid and/or gaseous phase. Passageways 21 communicate with an outlet, such as smokestack 23, for the discharge of flue gases.

Industrial wastes D are introduced through hopper 14 to chamber 11a, where the wastes undergo pyrolysis and/or combustion and thus are converted into residues, which are discharged through chute 15, and into flue gases. The flue gases pass through chamber 12a and then through passageways 21 of boiler 20 in the direction indicated by the arrows F.

In accordance with the present invention, efficient combustion of the wastes in chamber 11a is attained at a controlled temperature so as to obtain, at the outlet of this chamber, flue gases whose oxygen content is limited to the specific range of 0 to 7% and whose temperature also is limited to the specific region of 400° to 1200° C. This results in combustion of the flue gases in chamber 12a at an adiabatic temperature limited to the range 1300° to 1600° C. To bring about these desired conditions, the composition and feed rate of the oxygenated combustion-supporting gas introduced into chambers 11a and 12a are regulated. For this purpose, the illustrated installation is provided, in addition to furnace 10 and boiler 20, with an arrangement generally designated 30, for controlling the supply of oxygenated combustion-supporting gas to chambers 11a and 12a. This arrangement regulates the composition and feed rate of the oxygenated gas entering chambers 11a and 12a, and thus controls combustion in these chambers. Such regulation is attained by sensing predetermined characteristics of the flue gases at the outlets of these chambers, and then subjecting the oxygenated gas to inlet regulation.

In arrangement 30, the oxygenated gas is comprised of two constituents, air and substantially pure oxygen. The air is supplied by a suitable source 31 and the oxygen is supplied by a suitable source 32. Source 32 may consist of a liquefied-gas supply of oxygen. Branches 310 and 320 supply the mixed, oxygenated gas separately to chamber 11a and to chamber 12a, respectively.

Branch 310 is provided with a conduit 311 which discharges to the inlet end of chamber 11a, and is connected to two feed pipes 312 and 313 which communicate with the sources 31 and 32, respectively. Flow detectors 314 and 315 are disposed in pipes 312 and 313, respectively. Electric flow-regulating valves 316 and 317 also are positioned in these pipes, as shown.

Branch 320 is provided with a conduit 321 which discharges to the blast box 16 and is connected to two feed pipes 322 and 323 which communicate with sources 31 and 32, respectively. Flow detectors 324 and 325 are disposed in pipes 322 and 323, respectively. Electric flow-regulating valves 326 and 327 also are positioned in these pipes.

Flow detectors 314, 315, 324 and 325 are adapted to sense the flow of gas in their associated pipes 312, 313, 322 and 323, respectively, and to produce electric signals as a function of the flow detected by them. These signals are used to regulate valves 316, 317, 326 and 327 to maintain desired feed rates in the air and oxygen which pass therethrough.

A temperature probe 331 and an oxygen probe 333 are disposed at the outlet of chamber 11a. Temperature probe 331 communicates with a temperature detector 332 and oxygen probe 333 communicates with an oxygen metering device 335. Similarly, a temperature probe 341 and an oxygen probe 343 are disposed at the outlet of chamber 12a. Temperature probe 341 communicates with a temperature detector 342 and oxygen probe 343 communicates with an oxygen metering device 345. All of these elements are known to those of ordinary skill and need not be further described.

Temperature detectors 332 and 342 and the oxygen metering devices 335 and 345 are adapted to produce electric signals as a function of the temperature and oxygen metering which they detect.

An electronic control unit 350, such as a central processing unit (CPU), receives the signals produced by the various detectors and metering devices, processes these signals in accordance with preset conditions, such as a suitable program, and generates control signals to actuate electric valves 316, 317, and 327. CPU 350 is programmed on the basis of the characteristics of the wastes treated, that is, on the basis of their composition, their heating value, their more or less pronounced inhomogeneity, and also on the basis of whether any valuable constituents in these wastes are to be recovered. This programming regulates valves 316 and 317 to obtain, in first chamber 11a, a controlled combustion consistent with the preset objectives sought to be accomplished (e.g. complete combustion but with recovery of a constituent having certain physical properties; or complete combustion without regard to the recovery of any product). The programming of CPU 350 regulates valves 326 and 327 to obtain, in second chamber 12a, complete combustion of the flue gases, consistent with the normal operating conditions of this chamber.

When it is desired to recover a constituent from the waste, combustion is the first chamber should be conducted so as to avoid burning or excessively oxidizing the recoverable constituent, which may be a metal such as copper, aluminum, lead or iron, or coke. As a practical matter, oxidation exceeding 5% by weight of the recoverable constituent should be avoided. Further, care should be taken to assure that the recoverable constituent is not degraded by the heat, that is, that the recoverable constituent does not melt or evaporate, i.e., undergo a change in physical state.

The foregoing can be achieved if the temperature of the flue gases is maintained within a range of 50° C. and is selected to be in a region from 400° C. to an upper limit above which the recoverable constituent of the wastes may be degraded. The lower limit of 400° C. assures that the unrecoverable portion of the wastes is effectively pyrolyzed to pass into chamber 12a as combustible flue gases.

Two examples of the heat treatment process in accordance with the present invention now will be described.

EXAMPLE 1

Industrial wastes consisting of aluminum chips covered with grease and oil, are to be heat treated, and the chips are to be recovered. The average oil content of these wastes is 10 percent by weight, based on the aluminum. The average molecular composition of the oils and grease which are to be burned, is $CH_2$. The heating value of these wastes due to the oil is 1,000 kcal/kg. It is assumed that the feed rate of the contaminated aluminum to be treated is 1000 kg/h. It also is assumed that the furnace used is a rotary furnace whose first combustion chamber (such as chamber 11a) is formed of a rotary drum having an inside diameter of 1 m and a length of 4 m.

In the present example, CPU 350 is programmed so that the total oxygen supplied to the first chamber is fed at a rate of 150 $m^3$/h, of which 80 $m^3$/h is pure oxygen, and 350 $m^3$/h is air.

The flue gases resulting from the pyrolysis and controlled combustion of the oils and grease in chamber 11a will have an oxygen content of less than 0.1%, a heating value of about 1200 kcal/$m^3$, and an average temperature of 620° C. The rate at which the pure oxygen is supplied is based on this temperature of the flue gases at the outlet of chamber 11a. If the temperature rises to 645° C., as sensed by temperature probe 331, the feed rate of the pure oxygen is decreased in 5 $m^3$/h steps until the flue-gas temperature drops to 620° C. If the temperature of the flue gases leaving chamber 11a falls to 595° C., the feed rate of the pure oxygen is increased in 5 $m^3$/h steps until the flue-gas temperature reaches 620° C.

With the flue gases entering chamber 12a from chamber 11a having an average temperature of 620° C., an average heating value of 1200 kcal/$m^3$ and a feed rate of 600 $m^3$/h, air is injected into the second chamber at a rate of 650 $m^3$/h, to assure complete combustion of these flue gases with an adiabatic flame temperature of the mixture of flue gas and oxygenated gas of 1450° C. The oxygen content of the flue gases exiting from chamber 12a is about 5%. These hot flue gases are supplied to boiler 20 wherein about 2.4 tons of steam per hour is generated.

When none of the constituents of the wastes is to be recovered and everything that is combustible is to be burned, the temperature in chamber 11a need be limited only by one of the following factors:

The maximum temperature which the refractory walls of chamber 12 can withstand.

The fusing temperature of the residue ashes.

The possibility that the refractory material of chamber 11a might be destroyed by one of the constituents of the wastes, such as alkali metals, for example.

For safety reasons, the maximum flue-gas temperature is limited to 100° C. below the temperature that should not be exceeded in chamber 11a. The flue gases leaving this chamber may have any desired oxygen content up to a maximum of 7%.

Although complete burning is desired, combustion in chamber 11a should be controlled since most wastes (rubber, plastics, tars, solvents, and the like) form flue gases which contain a large amount of unburned solids. To complete the combustion of these unburned solids without the use of makeup fuel, the flue gases from chamber 11a should have a heating value of at least 600 kcal/m$^3$ for burning with air in second chamber 12a, and a heating value of at least 200 kcal/m$^3$ for burning with pure oxygen in the second chamber.

EXAMPLE 2

Rubber wastes having a heating value of 8000 kcal/kg and a feed rate of 150 kg/h are to be burned. Let it be assumed that, in view of the fusibility of the residual ashes, and further in view of the refractory material forming the walls of chamber 11a the temperature should not exceed 1100° C. in this chamber.

With these criteria, CPU 350 is programmed to regulate the oxygenated gas injected into first chamber 11a such that a total of 300 m$^3$/h of oxygen is supplied in the form of 100 m$^3$/h of pure oxygen and 1000 m$^3$/h of air. This produces flue gases having a temperature of 975° C., a heating value of 250 kcal/m$^3$ and an oxygen content of 2%.

The feed rate of oxygenated gas supplied to the first chamber, and also its composition, are regulated as a function of the temperature of the flue gases emitted from this first chamber. When this temperature reaches 1000° C., as sensed by temperature probe 331, the feed rate of the pure oxygen is reduced in 5 m$^3$/h steps until the temperature drops to 975° C. When the temperature decreases to 950° C., the feed rate of the pure oxygen is increased in 5 m$^3$/h steps until the temperature rises to 975° C.

With the flue gases entering chamber 12a from chamber 11a having a temperature of 975° C., a heating value of 250 kcal/m$^3$ and a feed rate of 1300 m$^3$/h, a total of 140 m$^3$/h of oxygen is introduced into chamber 12a for complete combustion of the flue gases and the unburned solids which they contain. This oxygen is in the form of a mixture of air at a feed rate of 500 m$^3$/h and pure oxygen at a feed rate of 40 m$^3$/h, with the addition of natural gas to the oxygen at a feed rate of 10 m$^3$/h. This addition of natural gas assures complete combustion of the flue gases with an adiabatic flame temperature of the mixture of oxygenated gas and flue gas of 1400° C. The oxygen content of the flue gases leaving the second chamber is about 5%.

The heat produced by combustion of the flue gas is used for the generation of about 3.6 tons of steam per day in boiler 20.

In the two foregoing examples, it has been assumed that there is a variation (increase or decrease) in the temperature of the flue gases exiting from the first chamber, which variation requires a variation (decrease or increase, respectively) of the feed rate of the pure oxygen in order to re-establish the original temperature level. This variation of the oxygen feed rate produces a corresponding variation in the oxygen content of the oxygenated gas (i.e., the mixture of oxygen and air) and also in the rate at which the total oxygen (pure oxygen plus atmospheric oxygen) is supplied to chamber 11a. If only the temperature of the flue gases varies, but the oxygen content thereof does not, as has been assumed in the foregoing examples, the rate at which air is supplied also must be varied in order to maintain a constant total oxygen content so as to prevent variation of the oxygen content of the flue gases.

Conversely, a variation (increase or decrease) in the oxygen content of the flue gases exiting from chamber 11a, sensed by oxygen probe 333, which variation is not accompanied by a variation in the temperature thereof requires, in order to re-establish the original oxygen content, a variation (decrease or increase, respectively) of the total oxygen feed rate (i.e. pure oxygen plus air) supplied to this chamber without a variation in the oxygen content of the oxygenated gas. This is accomplished by varying the feed rate of pure oxygen and the feed rate of the air in the same direction (i.e., both being increased or decreased).

If the temperature and oxygen content of the flue gases exiting from the first chamber vary concurrently, both the total feed rate and oxygen content of the oxygenated gas must be varied to re-establish the original levels.

Similar regulation of the oxygenated gas supplied to chamber 12a is controlled as a function of the temperature and oxygen content of the flue gases exiting therefrom, as sensed by temperature probe 341 and oxygen probe 343 in the same manner as described above. Thus, the feed rate of the pure oxygen and the feed rate of the air, which are mixed to form the oxygenated gas, are selectively varied.

If desired, a second conduit (not shown) may be added to conduit 311, for example, this second conduit may be concentric therewith, for the optional introduction of a make-up gas, such as a hydrocarbon, into chamber 11a. Likewise, conduit 321 may be provided with a similar concentric conduit for the introduction of a hydrocarbon into chamber 12a. The oxygenated gas, and optionally the hydrocarbon, might be introduced into chambers 11a and 12a by means of nozzles or the like. Furthermore, arrangement 30, which regulates the supply of oxygenated gas to chambers 11a and 12a, might be provided with control apparatus to produce pneumatic signals and with a pneumatic control unit which responds to such signals to actuate pneumatic valves.

While the present invention has been particularly shown and described with reference to a preferred embodiment, it should be readily apparent that various changes and modifications in form and details may be made without departing from the spirit and scope of the invention. It is, therefore, intended that the appended claims be interpreted as including such changes and modifications.

What is claimed is:

1. A method for the heat treatment of industrial wastes wherein at least some of the constituent materials of said wastes are subjected to combustion and/or to pyrolysis to produce a residue and flue gases, said method comprising the steps of supplying air at a first feed rate; supplying substantially pure oxygen at a second feed rate; mixing said air and oxygen to form an oxygenated combustion-supporting gas; supplying said oxygenated gas to said wastes for the heat treatment of the latter; sensing at least one predetermined characteristic of said flue gases; and regulating at least one of said first and second feed rates in response to said sensed characteristic to maintain said characteristic within predetermined limits.

2. The method of claim 1 wherein said predetermined characteristic is the oxygen content of said flue gases;

and said step of regulating comprises adjusting said first and second feed rates to vary the total feed rate at which said oxygenated gas is supplied to said wastes without substantially varying the oxygen content thereof to maintain the oxygen content of said flue gases within the range 0 to 7%.

3. The method of claim 1 wherein said predetermined characteristic is the temperature range of said flue gases; and said step of regulating comprises adjusting said second feed rate to maintain said temperature within a range of 50° C. in a region of from 400° to 1200° C.

4. The method of claim 3 wherein said step of regulating further comprises adjusting said first feed rate such that the total oxygen content of said oxygenated gas supplied to said wastes is kept substantially constant so as not to vary the oxygen content of said flue gases.

5. A method for the heat treatment of industrial wastes wherein at least some of the constituent materials of said wastes are subjected to combustion and/or to pyrolysis to produce a residue and flue gases, said method comprising the steps of supplying air at a first feed rate; supplying substantially pure oxygen at a second feed rate; mixing said air and oxygen to form an oxygenated combustion-supporting gas; supplying said oxygenated gas to said wastes for the heat treatment of the latter; sensing the temperature of the flue gases produced from said heat treatment; sensing the oxygen content of the flue gases produced from said heat treatment; adjusting said second feed rate in response to said sensed temperature to maintain the temperature of the flue gases within a predetermined range in the region 400° to 1200° C.; and adjusting said first and second feed rates in response to said sensed oxygen content to maintain a substantially constant oxygen content of said oxygenated gas so as not to vary the oxygen content of said flue gases.

6. The method of claim 5 further comprising the steps of sensing said first and second feed rates; and adjusting said first and second feed rates in the event that the sensed feed rates vary from desired values.

7. The method of claim 5 wherein said wastes contain recoverable materials that do not undergo combustion or pyrolysis; and wherein said step of adjusting further comprises selectively adjusting said first and second feed rates to maintain the oxygen content of said flue gases at a level below that which would be present if 5% by weight of said recoverable materials is oxidized, and selectively adjusting said second feed rate to maintain the temperature of said flue gases at a level below that which would be present if said recoverable materials undergo a phase change.

8. The method of claim 5 wherein all of said materials of said wastes are to be subjected to combustion and/or pyrolysis in a chamber capable of withstanding a maximum temperature, and wherein said step of adjusting comprises selectively adjusting said first and second feed rates to maintain the oxygen content of said flue gases at a level between 0 and 7% and selectively adjusting said second feed rate to maintain the temperature of said flue gases approximately 100° C. below said maximum temperature.

9. A method for the heat treatment of industrial wastes wherein at least some of the constituent materials of said wastes are subjected to combustion and/or to pyrolysis to produce a residue and flue gases and wherein said flue gases are subjected to combustion, said method comprising the steps of supplying a mixture of air and substantially pure oxygen, constituting an oxygenated gas, to said wastes for the heat treatment of the latter; sensing at least one of the characteristics of the flue gases produced by the combustion and/or pyrolysis of said wastes, said characteristics including temperature and oxygen content; selectively adjusting the feed rate of at least one of said air and oxygen supplied to said wastes in response to said sensed characteristics; supplying a mixture of air and substantially pure oxygen to said flue gases for the combustion thereof; sensing at least one of the characteristics of the flue gases after combustion thereof, said last-mentioned characteristics including temperature and oxygen content; selectively adjusting the rate at which at least one of said air and said oxygen is supplied to said flue gases in response to said sensed last-mentioned characteristics; and utilizing the heat obtained from the combustion of said flue gases.

10. The method of claim 9 wherein said step of utilizing comprises generating steam from the heat obtained from the combustion of said flue gases.

11. The method of claim 9 wherein said step of utilizing comprises transferring said heat obtained from the combustion of said flue gases to a heat exchange fluid.

12. The method of claim 11 further comprising the step of supplying a gas, combustible in addition to said oxygenated gas, to at least one of said wastes and said flue gases.

13. Apparatus for the heat treatment of industrial wastes, comprising a furnace having a waste treating section in which at least some of the constituent materials of said wastes are subjected to combustion and/or pyrolysis to produce flue gases; a source of air; a source of substantially pure oxygen; mixing means for mixing said air and oxygen to produce an oxygenated combustion-supporting gas; means for supplying said oxygenated gas to said waste treating section; sensing means for sensing at least one predetermined characteristic of said flue gases; and regulating means for regulating the rate at which at least one of said air and oxygen is supplied to said mixing means in response to said sensed characteristic.

14. Apparatus for the heat treatment of industrial wastes, comprising a furnace having a waste treating section in which at least some of the constituent materials of said wastes are subjected to combustion and/or pyrolysis to produce flue gases and a residue; a source of air; a source of substantially pure oxygen; mixing means for mixing said air and oxygen to produce an oxygenated gas; means for supplying said oxygenated gas to said waste treating section; sensing means for sensing at least one predetermined characteristic of said flue gases; air feed rate regulating means for regulating the rate at which air is fed to said mixing means; oxygen feed rate regulating means for regulating the rate at which oxygen is fed to said mixing means; and control means for controlling at least one of said regulating means in response to said sensed predetermined characteristic.

15. The apparatus of claim 14 wherein said sensing means comprises oxygen sensing means for sensing the oxygen content of said flue gases; and said control means is operative to adjust said air feed rate regulating means and said oxygen feed rate regulating means to vary the total feed rate at which said oxygenated gas is supplied to said waste treating section without substantially varying the oxygen content thereof to maintain the oxygen content of said flue gases within the range 0 to 7%.

16. The apparatus of claim 14 wherein said sensing means comprises temperature sensing means for sensing the temperature of said flue gases; and said control means is operative to adjust said oxygen feed rate regulating means to vary the total feed rate and oxygen content of the oxygenated gas supplied to said waste treating section to maintain the temperature of said flue gases within a range of 50° C. in a region of from 400° to 1200° C.

17. The apparatus of claim 16 wherein said control means is further operative to adjust said air feed rate regulating means to keep the total oxygen content of the oxygenated gas supplied to said waste treating section substantially constant so as not to vary the oxygen content of said flue gases.

18. Apparatus for the heat treatment of industrial wastes comprising a furnace having a waste treating section in which at least some of the constituent materials of said wastes are subjected to combustion and/or pyrolysis to produce flue gases and a residue; a source of air; a source of substantially pure oxygen; mixing means for mixing said air and oxygen to produce an oxygenated gas; means for supplying said oxygenated gas to said waste treating section; temperature sensing means for sensing the temperature of said flue gases emitted by said waste treating section; oxygen sensing means for sensing the oxygen content of said flue gases; air feed rate regulating means for regulating the rate at which air is fed to said mixing means; oxygen feed rate regulating means for regulating the rate at which oxygen is fed to said mixing means; and control means for selectively controlling said oxygen feed rate regulating means in response to said sensed temperature to maintain the temperature of said flue gases within a predetermined range in the region 400° to 1200° C., and for selectively controlling both said oxygen feed rate regulating means and said air feed rate regulating means in response to said sensed oxygen content to maintain a substantially constant oxygen content of said oxygenated gas so as not to vary the oxygen content of said flue gases.

19. The apparatus of claim 18 further comprising oxygen feed rate sensing means for sensing the rate at which said oxygen is supplied to said mixing means; air feed rate sensing means for sensing the rate at which said air is supplied to said mixing means; and wherein said control means is responsive to the sensed rates at which said oxygen and air are supplied to said mixing means to control said oxygen and air feed rate regulating means, respectively, in the event that the last-mentioned sensed rates vary from preset values.

20. The apparatus of claim 18 wherein said wastes contain recoverable materials that do not undergo combustion or pyrolysis; and wherein said control means is operative to selectively control said air and oxygen feed rate regulating means to maintain the oxygen content of said flue gases at a level below that which would be present if 5% by weight of said recoverable materials is oxidized, and said control means is operative to selectively control said oxygen feed rate regulating means to maintain the temperature of said flue gases at a level below that which would be present if said recoverable materials undergo a phase change.

21. The apparatus of claim 18 wherein substantially all of said materials of said wastes are to be subjected to combustion and/or pyrolysis, and said waste treating section is capable of withstanding a maximum temperature; aand wherein said control means is operative to selectively control said air and oxygen feed rate regulating means to maintain the oxygen content of said flue gases at a level between 0 to 7%, and said control means is operative to selectively control said oxygen feed rate regulating means to maintain the temperature of said flue gases approximately 100° C. below said maximum temperature.

22. The apparatus of claim 18 wherein each of said air and oxygen feed rate regulating means comprises a flow-regulating valve.

23. The apparatus of claim 22 wherein said temperature sensing means includes a temperature probe from which an electrical temperature representing signal is derived; and said oxygen sensing means includes an oxygen probe from which an electrical oxygen-content representing signal is derived.

24. The apparatus of claim 23 wherein said control means comprises a central processing unit responsive to said temperature and oxygen-content representing signals for supplying flow regulating signals to said flow-regulating valves.

25. Apparatus for the heat treatment of industrial wastes comprising a furnace having a waste treating section in which at least some of the constituent materials of said wastes are subjected to combustion and/or pyrolysis to produce flue gases and a residue, and a flue gas combustion section in which said flue gases received from said waste treating section are subjected to combustion; a source of air; a source of substantially pure oxygen; first and second mixing means for mixing said air and oxygen to produce oxygenated gas; first means for supplying the oxygenated gas produced by said first mixing means to said waste treating section; second means for supplying the oxygenated gas produced by said second mixing means to said flue gas combustion section; first temperature sensing means disposed to sense the temperature of the flue gases exiting from said waste treating section; first oxygen sensing means disposed to sense the oxygen content of the flue gases exiting from said waste treating section; first air feed rate regulating means for regulating the rate at which air is fed to said first mixing means; first oxygen feed rate regulating means for regulating the rate at which oxygen is fed to said first mixing means; second temperature sensing means disposed to sense the temperature of the flue gases exiting from said flue gas combustion section; second oxygen sensing means disposed to sense the oxygen content of the flue gases exiting from said flue gas combustion section; second air feed rate regulating means for regulating the rate at which air is fed to said second mixing means; second oxygen feed rate regulating means for regulating the rate at which oxygen is fed to said second mixing means; control means for selectively controlling at least one of said first air and oxygen feed rate regulating means in response to at least one of the sensed temperature and oxygen content of the flue gases exiting from said waste treating section, and for selectively controlling at least one of said second air and oxygen feed rate regulating means in response to at least one of the sensed temperature and oxygen content of the flue gases exiting from said flue gas combustion section; and heat utilization means for receiving the flue gases exiting from said flue gas combustion section to utilize the heat of said flue gases.

26. The apparatus of claim 25 wherein said heat utilization means comprises a steam generator for generating steam from the heat of said flue gases.

27. The apparatus of claim 25 wherein said heat utilization means comprises a heat exchanger.

28. The apparatus of claim 25 further comprising means for supplying a combustible gas, in addition to the oxygenated gas, to at least one of said waste treating and flue gas combustion sections.

29. The apparatus of claim 28 wherein said combustible gas is a hydrocarbon.

* * * * *